United States Patent
Pettigrew

(10) Patent No.: US 9,759,596 B2
(45) Date of Patent: Sep. 12, 2017

(54) CAP WITH VISIBLE FLOAT GAUGE

(71) Applicant: Marc David Pettigrew, Dayton, OH (US)

(72) Inventor: Marc David Pettigrew, Dayton, OH (US)

(*) Notice: Subject to any disclaimer, the term of this patent is extended or adjusted under 35 U.S.C. 154(b) by 0 days.

(21) Appl. No.: 14/920,396

(22) Filed: Oct. 22, 2015

(65) Prior Publication Data
US 2016/0069726 A1    Mar. 10, 2016

(51) Int. Cl.
*G01F 23/64*     (2006.01)
*G01F 23/30*     (2006.01)

(52) U.S. Cl.
CPC ............. *G01F 23/64* (2013.01); *G01F 23/30* (2013.01)

(58) Field of Classification Search
CPC .................................. G01F 23/58; G01F 23/64
See application file for complete search history.

(56) References Cited

U.S. PATENT DOCUMENTS

| | | | | |
|---|---|---|---|---|
| 2,840,034 A | * | 6/1958 | Danias | G01F 23/58 116/228 |
| 2,868,016 A | * | 1/1959 | Steed | G01F 23/58 73/322 |
| 2,964,945 A | * | 12/1960 | Walkowiak | B60T 17/225 73/322 |
| 3,170,325 A | * | 2/1965 | Sinclair | H01M 2/362 429/91 |
| 3,216,256 A | * | 11/1965 | Barnes | G01F 23/58 116/228 |
| 3,370,468 A | * | 2/1968 | Healy | G01F 23/58 123/41.15 |
| 4,170,136 A | * | 10/1979 | Martineau | G01F 23/58 73/307 |
| 4,526,033 A | * | 7/1985 | Flider | G01F 23/58 116/228 |

* cited by examiner

*Primary Examiner* — Daniel J Colilla

(57) ABSTRACT

The present invention, a cap for liquids with a visible float gauge, is comprised of a hollow, cylindrical cap made of transparent material, a color coded display of levels and/or a text display, and a fixed inner cylinder. The inner cylinder is attached to the cap top at its top end. The inner piece is concentrically placed in the cylindrical cap inside of the float gauge, and a float gauge is internally retained by the cap. The cap is then screwed on to a liquid reservoir as is found on a typical internal combustion engine, whereupon the float gauge floats on the liquid and is seen through the transparent part of the cap. The float gauge is the indicator, giving a liquid level reading.

1 Claim, 1 Drawing Sheet

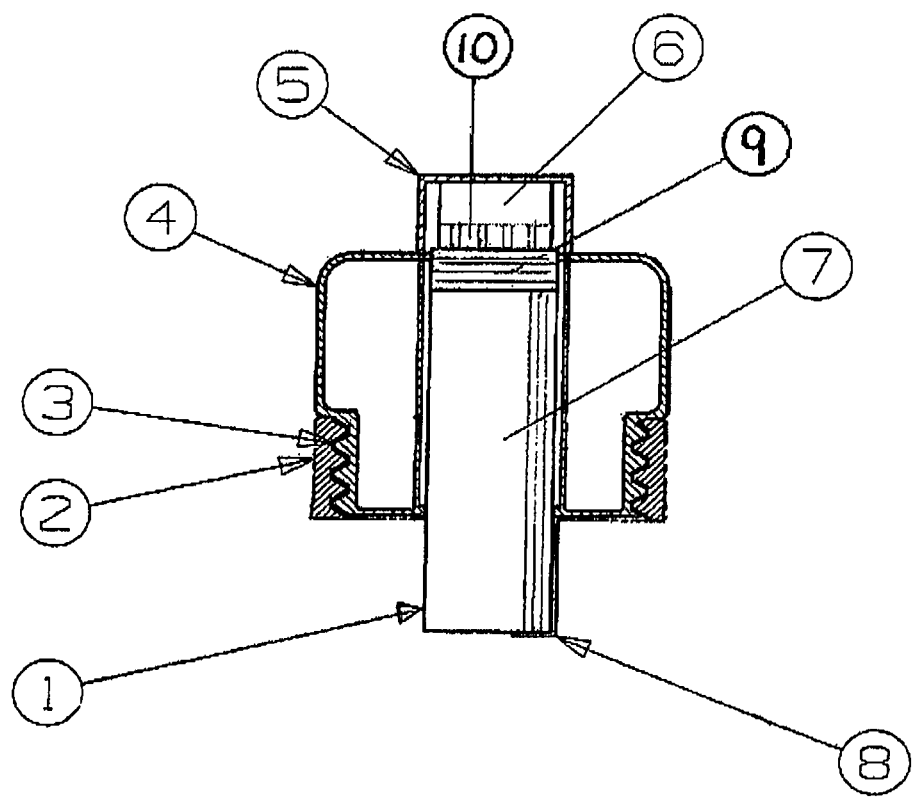

CAP WITH VISIBLE FLOAT GAUGE

BACKGROUND OF THE INVENTION

1. Field of the Invention

The present invention generally relates to a liquid-level-indicating apparatus and particularly to a cap with built-in dipstick.

2. Description of the Prior Art

Maintaining proper liquid level for the lubrication and hydraulics of vehicles or anything using an internal combustion engine to that specified by the manufacturer is significant in preventing accidents and premature wear. Many owners and service technicians utilize the dipstick to check liquid levels. To do so one must remove the dipstick and cap, take a rag, wipe the dipstick clean, insert the dipstick, remove it, visually inspect the liquid level, and replace the dipstick and cap. In the case of checking the oil level, it can be very difficult to see the oil on the dipstick. Often the level is not read because of inconvenience or misread because of difficulty.

The prior art discloses liquid-level-indicating apparatus of various designs and means; regular dipstick patents: Dipstick guide U.S. Pat. No. 4,155,167 A to DeLano Jun. 22, 1978; Dipstick U.S. Pat. No. 2,314,430 A to Harry Feb. 26, 1941; Oil level indicator U.S. Pat. No. 3,316,647 A to Sven May 12, 1965.

Patents that incorporate a dial indicator must be read against a clock type face. All these type patents are complicated, expensive to manufacture; Fuel tank gauge U.S. Pat. No. 4,724,706 A to Stiever Dec. 22, 1986;

Portable fuel gauge for fuel tank US 20100089306 A1 to Dunkle and Frank; Fuel gauge cap U.S. Pat. No. 7,658,105 B2 to Holz; Motorcycle fuel level gauge U.S. Pat. No. 4,807,472 A to Brown and Hamann; Ratcheting gauge cap U.S. Pat. No. 8,434,364 B2 to Bork and Holz; Moped and motorcycle gas tank lid with an integrated level indicator via a viewing window with a green marking ball operated by a plastic hose with a float DE 3617073 A1 to Oehl; Display device for displaying oil level in an engine, has float connected by rod to level indicator that shows oil level over a wide range, thus a driver can see at any time current oil level DE 10101592 A1 to Polewarczyk; Display device has a float (1) supported by the oil in a reservoir or sump. An indicator (3) for displaying the oil level is connected to the float using a connection rod (2), Oct. 24, 2007; Motorcycle oil level display apparatus CN 101417680 B to Chen Liangqian.

Although these prior art patents disclose various liquid level indicating methods and devices, none of them disclose a liquid level gauge of the particular type as disclosed and claimed herein.

It is thus a primary objective of the present invention to provide a cap with visible float gauge which utilizes the float gauge as the level indicator. Another objective of the present invention is to provide a cap with visible float gauge which utilizes a transparent housing having color coded levels for ready-viewing of liquid level.

SUMMARY OF THE INVENTION

The present invention is directed to a cap. It has a visible float gauge, a cylindrical hollow cap made of transparent material, a fixed cylinder, and has color coded levels and/or text levels. The whole unit is attached to a liquid reservoir. The inner cylinder is located concentrically and attaches to the top cap at one end. The lower end is color coded and/or text coded to indicate a low liquid level.

The cap is made of transparent material, and a float gauge is internally retained. The cap is then screwed on to a liquid reservoir as is found on a typical engine, whereupon the gauge floats on top of the liquid. The gauge is the indicator and rises and falls with the liquid level and gives a liquid level reading.

These, together with other objects of the invention, are pointed out clearly in the claims annexed to and forming a part of this disclosure. For a better understanding of this present invention, its operating advantages and the specific objects attained by its use, reference should be made to the accompanying drawings and descriptive matter in which there are illustrated preferred embodiments of the invention.

BRIEF DESCRIPTION OF THE DRAWINGS

The FIGURE illustrates the ballooned assembly vertical cross-sectional view showing all the elements.

In the FIGURE, No. 1 is the actual float itself. The float has two colors. No. 7 is one color of the float and No. 9 is a different color of the float. The float moves up automatically when the fluid is being filled, and the float moves down automatically as the fluid is used or depleted.

In the FIGURE, No. 4 the cap body is comprised generally of a cylindrical transparent housing No. 5 and fixed inner cylinder No. 6 which is colored yet a different color at No. 10 and the cap body is threaded at No. 3 about a portion of its exterior length. The threaded portion No. 3 is adapted to be received in mating threads No. 2 which define the reservoir fill can opening. No. 8 is the retainer, which holds the float in place.

The invention claimed is:

1. A cap with visible float gauge comprised of:
a hollow cylindrical cap having a first end and a second end,
said cylindrical cap being made of transparent material,
a plurality of liquid level markings on said cylindrical cap,
an internal or external thread formed within said cylindrical cap at said second end thereof, for mounting on a liquid reservoir typically found in vehicles or machines having lubrication, liquids, or hydraulics; and
a float gauge marked with color coded levels that indicate correct level on an upper portion and low liquid level on a lower portion;
said float gauge being retained by an internal shoulder and said float gauge rests on said shoulder at lowest liquid level position,
wherein the cylindrical cap further includes a non-floating color coded cylindrical portion for indicating a low level and the float gauge further comprises an indicator, wherein,
when the liquid reservoir is at a correct level, the upper portion of the float gauge is visibly exposed through said cylindrical cap,
when the liquid level is at a low liquid level, the color coded cylindrical portion of the cylindrical cap is visible through the cylindrical cap, and
when the liquid level is at a high liquid level, the lower portion of the float gauge is visible through the cylindrical cap.

* * * * *